(12) United States Patent
Nakamura

(10) Patent No.: US 11,919,462 B2
(45) Date of Patent: Mar. 5, 2024

(54) VEHICLE OCCUPANT MONITORING APPARATUS AND VEHICLE OCCUPANT PROTECTING SYSTEM

(71) Applicant: SUBARU CORPORATION, Tokyo (JP)

(72) Inventor: Ryota Nakamura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 752 days.

(21) Appl. No.: 17/060,460

(22) Filed: Oct. 1, 2020

(65) Prior Publication Data

US 2021/0103748 A1  Apr. 8, 2021

(30) Foreign Application Priority Data

Oct. 8, 2019  (JP) ................. 2019-185043

(51) Int. Cl.
| | | |
|---|---|---|
| B60R 21/013 | (2006.01) | |
| B60K 28/06 | (2006.01) | |
| B60R 16/037 | (2006.01) | |
| B60R 21/015 | (2006.01) | |
| G06V 10/141 | (2022.01) | |

(Continued)

(52) U.S. Cl.
CPC ............ *B60R 16/037* (2013.01); *B60K 28/06* (2013.01); *B60R 21/013* (2013.01); *B60R 21/01552* (2014.10); *G06V 10/141* (2022.01); *G06V 20/597* (2022.01); *G06V 40/10* (2022.01); *B60K 2370/21* (2019.05); *B60R 2021/01315* (2013.01); *B60R 2300/8006* (2013.01)

(58) Field of Classification Search
CPC ................ B60R 16/037; B60R 21/013; B60R 21/01552; B60R 2021/01315; B60R 2300/8006; B60R 1/00; B60R 21/01538; B60K 28/06; B60K 2370/21; G06V 10/141; G06V 20/597; G06V 40/10; B60W 40/08; H04N 7/181; H04N 23/60
USPC ........................................................ 382/104
See application file for complete search history.

(56) References Cited

U.S. PATENT DOCUMENTS

| | | | |
|---|---|---|---|
| 2009/0092284 A1* | 4/2009 | Breed ................... | G01S 7/4802 382/103 |
| 2017/0210357 A1 | 7/2017 | Nagai | |

FOREIGN PATENT DOCUMENTS

| | | |
|---|---|---|
| JP | 11-43009 A | 2/1999 |
| JP | 2016-38793 A | 3/2016 |

* cited by examiner

*Primary Examiner* — Huy C Ho
(74) *Attorney, Agent, or Firm* — TROUTMAN PEPPER HAMILTON SANDERS LLP

(57) ABSTRACT

A vehicle occupant monitoring apparatus includes two or more imaging modules and a controller. The imaging modules each include: a light-emitting device configured to emit and apply light to an occupant in a vehicle; and an imaging device configured to perform imaging of the occupant to obtain an imaging image. The controller is configured to cause the light-emitting device of each of the imaging modules to apply the light when the imaging device of corresponding one of the imaging modules performs the imaging. The controller is configured to cause, in a case where contact of the vehicle with another object is predicted or detected, the imaging device to perform the imaging to obtain the imaging image while causing the light-emitting devices of the imaging modules to apply the light together, and monitor the position of the occupant on the basis of the obtained imaging image.

10 Claims, 8 Drawing Sheets

(51) Int. Cl.
*G06V 20/59* (2022.01)
*G06V 40/10* (2022.01)

VEHICLE OCCUPANT MONITORING APPARATUS AND VEHICLE OCCUPANT PROTECTING SYSTEM

CROSS-REFERENCE TO RELATED APPLICATIONS

The present application claims priority from Japanese Patent Application No. 2019-185043 filed on Oct. 8, 2019, the entire contents of which are hereby incorporated by reference.

BACKGROUND

The technology relates to a vehicle occupant monitoring apparatus and a vehicle occupant protecting system.

Regarding a vehicle such as an automobile, there is a technique of performing imaging of an occupant present in the vehicle and determining a state of the occupant on the basis of an image captured by the imaging, for example, as disclosed in Japanese Unexamined Patent Application Publication Nos. H11-043009 and 2016-038793. Note that, under some circumstances, the occupant can feel sick due to frequent movement of the line of sight or any other reason.

SUMMARY

An aspect of the technology provides a vehicle occupant monitoring apparatus that includes two or more imaging modules and a controller. The imaging modules each include a light-emitting device and an imaging device. The light-emitting device is configured to emit light and apply the emitted light to an occupant present in a vehicle. The imaging device is configured to perform imaging of the occupant to obtain an imaging image. The controller is configured to control operation of each of the imaging modules and monitor a position of the occupant on the basis of the imaging image. The controller is configured to cause the light-emitting device of each of the imaging modules to apply the light to the occupant when the imaging device of corresponding one of the imaging modules performs the imaging of the occupant. The controller is configured to cause, in a case where contact of the vehicle with another object is predicted or detected, the imaging device to perform the imaging of the occupant to obtain the imaging image while causing the light-emitting devices of the respective imaging modules to apply the light to the occupant together, and monitor the position of the occupant on the basis of the obtained imaging image.

An aspect of the technology provides a vehicle occupant protecting system that includes a vehicle occupant monitoring apparatus and an occupant protecting apparatus. The vehicle occupant monitoring apparatus is configured to monitor a position of an occupant present in a vehicle. The occupant protecting apparatus is configured to perform protection control for the occupant on the basis of the position of the occupant monitored by the vehicle occupant monitoring apparatus. The vehicle occupant monitoring apparatus includes two or more imaging modules and a controller. The imaging modules each include a light-emitting device and an imaging device. The light-emitting device is configured to emit light and apply the emitted light to the occupant. The imaging device is configured to perform imaging of the occupant to obtain an imaging image. The controller is configured to control operation of each of the imaging modules and monitor the position of the occupant on the basis of the imaging image. The controller is configured to cause the light-emitting device of each of the imaging modules to apply the light to the occupant when the imaging device of corresponding one of the imaging modules performs the imaging of the occupant. The controller is configured to cause, in a case where contact of the vehicle with another object is predicted or detected, the imaging device to perform the imaging of the occupant to obtain the imaging image while causing the light-emitting devices of the respective imaging modules to apply the light to the occupant together, and monitor the position of the occupant on the basis of the obtained imaging image.

An aspect of the technology provides a vehicle occupant monitoring apparatus that includes two or more imaging modules and circuitry. The imaging modules each include a light-emitting device and an imaging device. The light-emitting device is configured to emit light and apply the emitted light to an occupant present in a vehicle. The imaging device is configured to perform imaging of the occupant to obtain an imaging image. The circuitry is configured to control operation of each of the imaging modules and monitor a position of the occupant on the basis of the imaging image. The circuitry is configured to cause the light-emitting device of each of the imaging modules to apply the light to the occupant when the imaging device of corresponding one of the imaging modules performs the imaging of the occupant. The circuitry is configured to cause, in a case where contact of the vehicle with another object is predicted or detected, the imaging device to perform the imaging of the occupant to obtain the imaging image while causing the light-emitting devices of the respective imaging modules to apply the light to the occupant together, and monitor the position of the occupant on the basis of the obtained imaging image.

An aspect of the technology provides a vehicle occupant protecting system that includes a vehicle occupant monitoring apparatus and an occupant protecting apparatus. The vehicle occupant monitoring apparatus is configured to monitor a position of an occupant present in a vehicle. The occupant protecting apparatus is configured to perform protection control for the occupant on the basis of the position of the occupant monitored by the occupant monitoring apparatus. The vehicle occupant monitoring apparatus includes two or more imaging modules and circuitry. The imaging modules each include a light-emitting device and an imaging device. The light-emitting device is configured to emit light and apply the emitted light to the occupant. The imaging device is configured to perform imaging of the occupant to obtain an imaging image. The circuitry is configured to control operation of each of the imaging modules and monitor the position of the occupant on the basis of the imaging image. The circuitry is configured to cause the light-emitting device of each of the imaging modules to apply the light to the occupant when the imaging device of corresponding one of the imaging modules performs the imaging of the occupant. The circuitry is configured to cause, in a case where contact of the vehicle with another object is predicted or detected, the imaging device to perform the imaging of the occupant to obtain the imaging image while causing the light-emitting devices of the respective imaging modules to apply the light to the occupant together, and monitor the position of the occupant on the basis of the obtained imaging image.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1A:
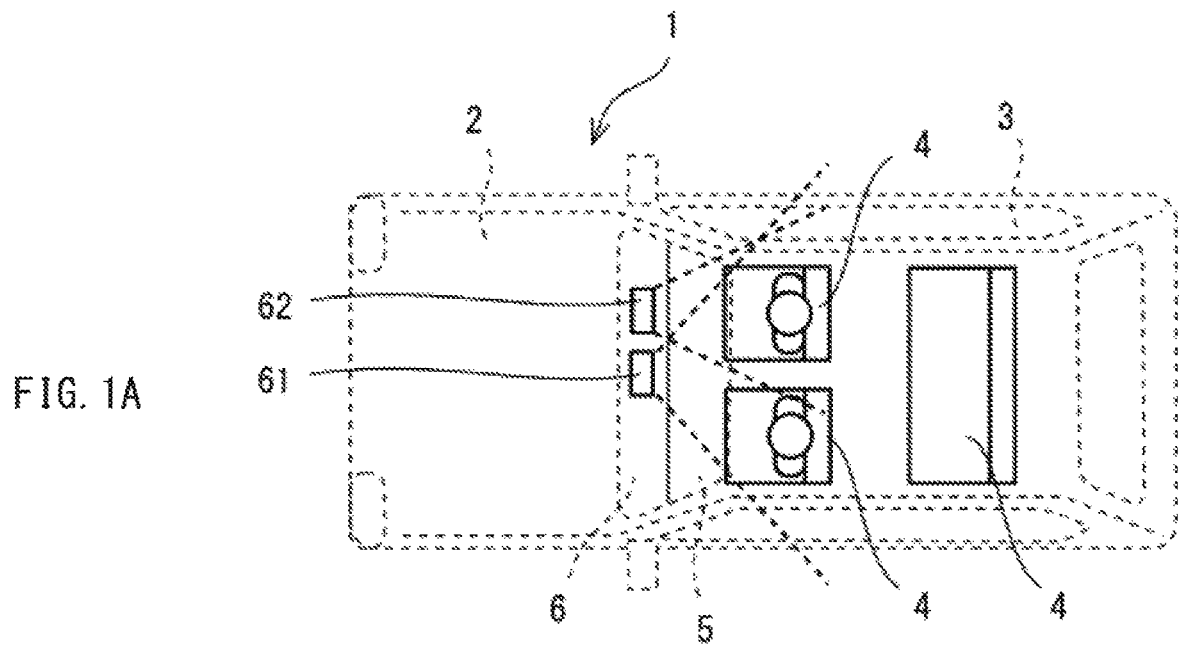
FIG. 1A is an explanatory schematic diagram illustrating an example of a vehicle according to one example embodiment of the technology.

In a vehicle, an occupant monitoring apparatus monitors a state of an occupant. However, the use of the occupant monitoring apparatus is not limited to such simple monitoring by itself. In addition, it is desired to use a result of the monitoring performed by the occupant monitoring apparatus for allowing any other apparatus on the vehicle to execute appropriate control for the occupant. Non-limiting examples of the result of the monitoring may include data regarding a position of the occupant. Non-limiting examples of the other apparatus may include an occupant protecting apparatus.

In a case of precisely monitoring, for example, the position of the occupant by means of the occupant monitoring apparatus, it may be desired to apply relatively-strong light to the occupant by means of, for example, a light-emitting device. In some situations, brightness inside the vehicle can be varied by an environment in which the vehicle is traveling, or light outside the vehicle can be applied to the occupant. In order to capture a clear image of the occupant including a part such as an outline of the occupant even in such situations, it is desired for the device such as the light-emitting device to apply relatively-strong light to the occupant.

However, such application of the relatively-strong light to the occupant can require a high output, which can lead to an increase in size of the light-emitting device. A relatively-large-sized light-emitting device can require a relatively-great current, which, in turn, can cause an increase in electric power consumption that is the square of the current of the light-emitting device. Further, a heatsink for cooling the light-emitting device can also be increased in size. Further, light emission with a higher luminous flux can cause a light quantity of the light emitted by the light-emitting device to decrease at an earlier timing.

As described above, it is desired to improve a vehicle occupant monitoring apparatus.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

Figure 1B:
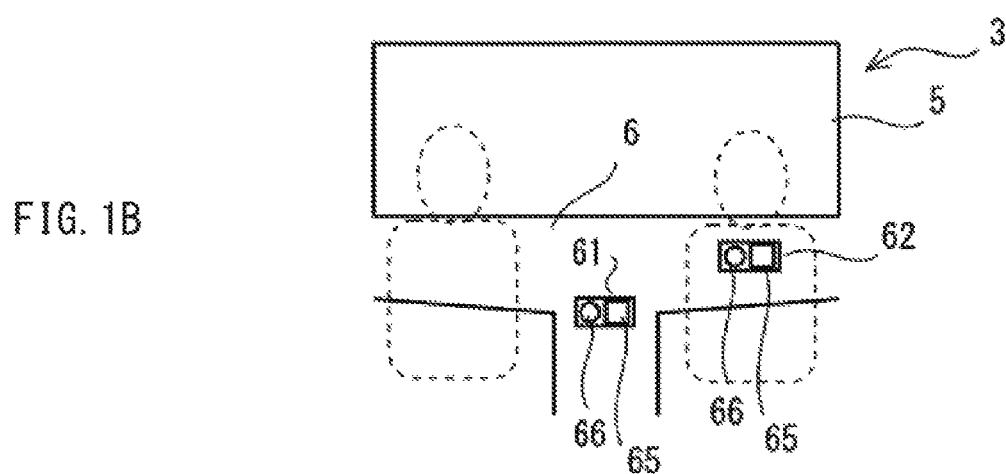
FIG. 1B is another explanatory schematic diagram illustrating an example of the vehicle according to one example embodiment of the technology.

FIGS. 1A and 1B each schematically illustrate a vehicle 1 according to an example embodiment of the technology.

FIG. 1A is a top view of the vehicle 1. FIG. 1B is an explanatory schematic diagram illustrating a front part of a vehicle compartment 3 of the vehicle 1.

The vehicle 1 may be an automobile as illustrated in FIG. 1, for example. The vehicle 1 may have a body 2 and the vehicle compartment 3 provided at the middle of the body 2. The vehicle compartment 3 may be a space in which an occupant is to be present in the vehicle 1. The vehicle compartment 3 may be provided with a seat 4 on which the occupant in the vehicle 1 sits. A windshield 5 may be provided at a front part of the vehicle compartment 3. Below the windshield 5 may be a dashboard 6. The dashboard 6 may be positioned in front of an upper body of the occupant sitting on the seat 4. The dashboard 6 may be provided with a steering wheel 31 that is positioned in front of the seat 4 for a driver and protrudes rearward. The steering wheel 31 may be adapted for the driver to operate traveling of the vehicle 1. Below the dashboard 6 may be a brake pedal 32 and an accelerator pedal 33 that are provided side by side. The brake pedal 32 and the accelerator pedal 33 may also be adapted for the driver to operate the traveling of the vehicle 1.

Figure 2:
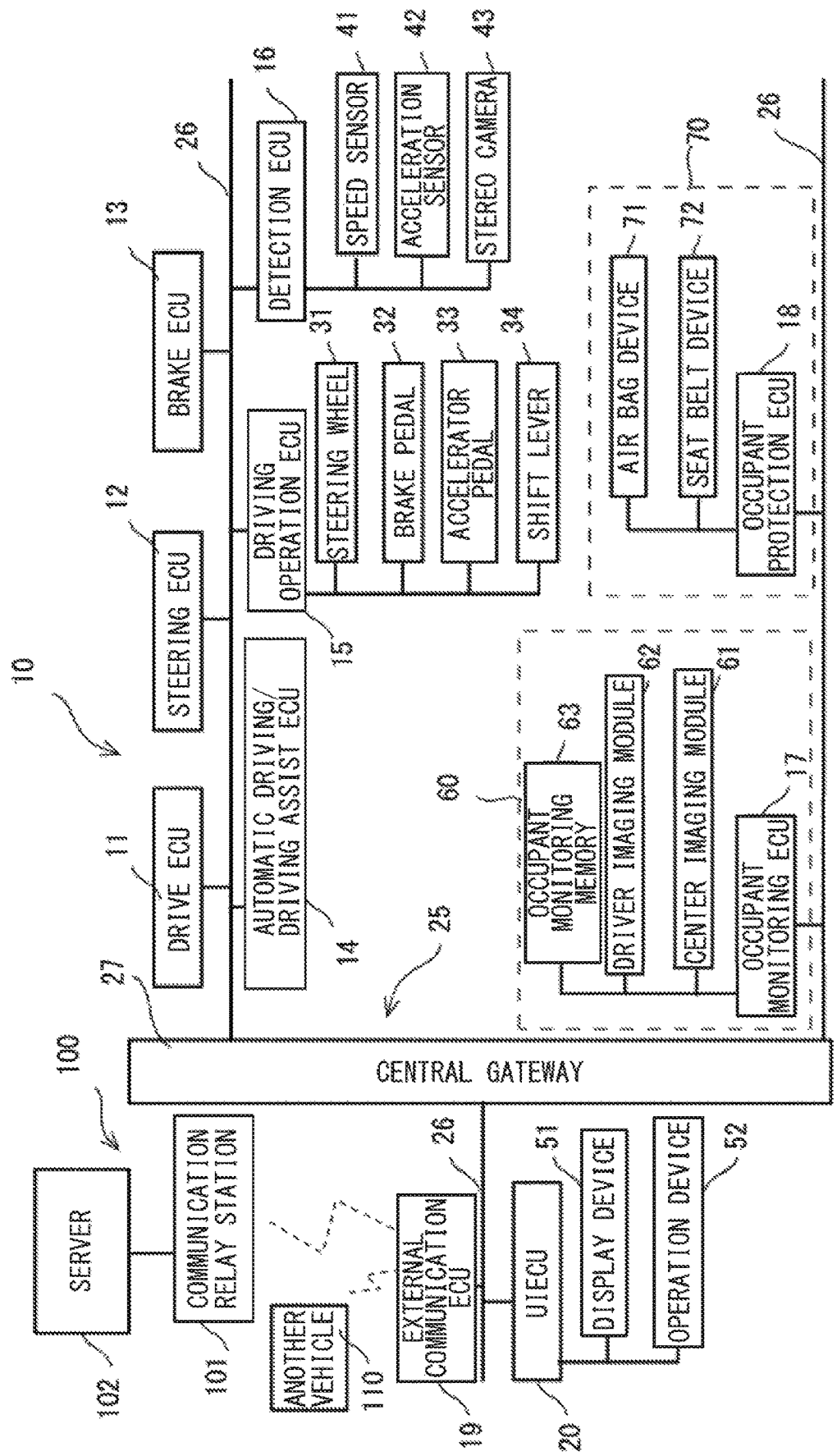
FIG. 2 is an explanatory schematic diagram illustrating an example of a control system of a vehicle illustrated in FIG. 1.

FIG. 2 schematically illustrates a control system 10 of the vehicle 1 illustrated in FIG. 1A.

FIG. 2 illustrates control modules included in the control system 10 of the vehicle 1 as represented by control electronic control units (ECUs) incorporated in the respective control modules.

The vehicle 1 may include an occupant monitoring apparatus 60. The occupant monitoring apparatus 60 may distinguish an occupant who is present in the vehicle 1 and may monitor the occupant during automatic driving that is independent from driving performed by the occupant such as the driver, or during manual driving performed by the occupant.

The vehicle 1 may further include an occupant protecting apparatus 70. The occupant protecting apparatus 70 may protect the occupant from an influence of contact of the vehicle 1 with another object.

These techniques may cooperate with each other organically, which helps to protect the occupant appropriately in accordance with a riding state of the occupant. This in turn helps to increase convenience and safety of the vehicle 1.

The control system 10 of the vehicle 1 described above may serve as an occupant protecting system of the vehicle 1 that includes the occupant monitoring apparatus 60.

FIG. 2 illustrates controllers included in the control system 10 of the vehicle 1 as represented by control ECUs incorporated in the respective controllers.

The control system 10 of the vehicle 1 illustrated in FIG. 2 may include, for example but not limited to: a drive ECU 11; a steering ECU 12; a brake ECU 13; an automatic driving/driving assist ECU 14; a driving operation ECU 15; a detection ECU 16; an occupant monitoring ECU 17 included in the occupant monitoring apparatus 60; an occupant protection ECU 18 included in the occupant protecting apparatus 70; an external communication ECU 19; and a UIECU 20. These control ECUs may be directly coupled to a cable 26 and may be coupled to a central gateway (CGW) 27 via a vehicle network 25. Non-limiting examples of the vehicle network 25 employed in the vehicle 1 may include a controller area network (CAN) and a local interconnect network (LIN). The central gateway 27 may serve as a relay. The control ECUs may communicate with each other on the basis of encrypted data having an own ID that identifies a transmission source and an ID of a destination control ECU. The control ECUs may each transmit data to other two or more control ECUs together in a broadcast fashion, on the basis of encrypted data that does not specify a destination control ECU. The control ECUs may each receive encrypted data belonging to a destination control ECU identified by the own ID and may use the received encrypted data for a control of the own control ECU. Alternatively, the control ECUs may each receive encrypted data belonging to a destination control ECU identified by a specific ID other than the own ID and may use the received encrypted data for a control of the own control ECU. The central gateway 27 may output received encrypted data to another cable 26, in a case where the encrypted data received from any of the cables 26 is to be transmitted to any control ECU coupled to the other cable 26. With this configuration, the control ECUs illustrated in FIG. 2 are able to transmit and receive the encrypted data mutually.

The drive ECU 11 may receive the encrypted data via the vehicle network 25 to control an unillustrated drive source and an unillustrated transmission provided in the vehicle 1. The drive source may be an engine, a motor, or both. With this configuration, the vehicle 1 is able to accelerate and run.

The steering ECU 12 may receive the encrypted data via the vehicle network 25 to control an unillustrated steering device provided in the vehicle 1. With this configuration, the vehicle 1 is able to change a traveling direction.

The brake ECU 13 may receive the encrypted data via the vehicle network 25 to control an unillustrated brake device provided in the vehicle 1. With this configuration, the vehicle 1 is able to decelerate and stop. The brake ECU 13 may also communicate with the drive ECU 11 via the vehicle network 25 to reduce a rotation of the drive source or to change a gear ratio of the transmission to thereby decelerate the running vehicle 1.

The driving operation ECU 15 may be coupled to operation members including: the steering wheel 31 used to operate traveling of the vehicle 1; the brake pedal 32; the accelerator pedal 33; and a shift lever 34, for example. The driving operation ECU 15 may output the encrypted data to any control ECU such as the automatic driving/driving assist ECU 14 via the vehicle network 25. The encrypted data outputted from the driving operation ECU 15 may include data regarding operation of any operation member operated by the occupant.

The detection ECU 16 may be coupled to sensors including a speed sensor 41, an acceleration sensor 42, and a stereo camera 43, for example. The speed sensor 41 may detect a speed of the vehicle 1. The acceleration sensor 42 may detect an acceleration rate of the vehicle 1. The stereo camera 43 may perform imaging of an outside environment around the vehicle 1. For example, the stereo camera 43 may perform imaging of locations including the front, the side, and the rear of the vehicle 1.

The detection ECU 16 may acquire a physical quantity detected by any of the sensors coupled to the detection ECU 16 or a physical quantity detected by any other device, as a physical quantity detected in the vehicle 1 upon the traveling of the vehicle 1. The detection ECU 16 may output the acquired physical quantity to any control ECU such as the automatic driving/driving assist ECU 14 or the occupant protection ECU 18 via the vehicle network 25.

For example, the detection ECU 16 may analyze images of the outside environment obtained by the stereo camera 43 to detect presence of another mobile body present around the vehicle 1. The detection ECU 16 may output, to any control ECU such as the automatic driving/driving assist ECU 14 or the occupant protection ECU 18 via the vehicle network 25, data regarding a type of the detected other mobile body, data regarding a relative distance of the detected other mobile body from the own vehicle 1, and data regarding a direction of the detected other mobile body relative to the own vehicle 1.

For example, the detection ECU 16 may analyze the images of the outside environment obtained by the stereo camera 43 to predict contact of the vehicle 1 with the other mobile body present around the vehicle 1. The detection ECU 16 may output data regarding the prediction of the contact to any control ECU such as the automatic driving/driving assist ECU 14 or the occupant protection ECU 18 via the vehicle network 25.

The detection ECU 16 may detect contact of the vehicle 1 with another object, when the acceleration sensor 42 detects a high acceleration rate of a predetermined value or greater. The detection ECU 16 may output data regarding the detection of the contact of the vehicle 1 to the occupant protection ECU 18.

The external communication ECU 19 may communicate with the outside of the vehicle 1. For example, the external communication ECU 19 may communicate with a communication relay station 101 of a traffic information system 100 to transmit and receive communication data between the external communication ECU 19 and a server 102. The external communication ECU 19 may also transmit and receive communication data, via any communication method such as V2X communication, between the external communication ECU 19 and another vehicle 110 traveling near the vehicle 1, or between the external communication ECU 19 and an unillustrated mobile terminal belonging to the pedestrian, for example. The external communication ECU 19 may perform these communications to receive data such as: navigation data to a destination of the vehicle 1; traffic data; or data regarding a situation around the vehicle 1. The external communication ECU 19 may output the thus-received data to any control ECU such as the automatic driving/driving assist ECU 14 via the vehicle network 25.

The external communication ECU 19 may acquire data regarding contact predicted by the other vehicle 110. The external communication ECU 19 may output the acquired data to any control ECU such as the automatic driving/driving assist ECU 14 or the occupant protection ECU 18 via the vehicle network 25.

The UIECU 20 may be coupled to a display device 51 and an operation device 52, for example. The operation device 52 may include a touch panel overlaid on a display screen of the display device 51, and a plurality of keys. The UIECU 20 may receive the encrypted data related to displaying, and may cause the display device 51 to display an image in a case where the UIECU 20 has received the encrypted data. The UIECU 20 may generate data such as navigation data, on the basis of operation that is performed on the operation device 52 in accordance with the displaying carried out on the display device 51. The UIECU 20 may output the data to any control ECU such as the automatic driving/driving assist ECU 14 via the vehicle network 25.

The automatic driving/driving assist ECU 14 may switch between the automatic driving and the driving assist to control the traveling of the vehicle 1. The automatic driving/driving assist ECU 14 may control the traveling of the vehicle 1 on the basis of various pieces of data acquired via the vehicle network 25. For example, upon the automatic driving, the automatic driving/driving assist ECU 14 may output control data to the drive ECU 11, the steering ECU 12, and the brake ECU 13 to cause the vehicle 1 to travel to the destination in accordance with the navigation data while confirming safety around the vehicle 1. Upon the driving assist, the automatic driving/driving assist ECU 14 may output control data to the drive ECU 11, the steering ECU 12, and the brake ECU 13 on the basis of the data regarding operation of any operation member operated by the occupant. The control data outputted upon the driving assist may be based on an amount of operation of any operation member that has been adjusted in accordance with, for example, safety around the vehicle 1.

The occupant monitoring ECU 17 may be coupled to a center imaging module 61, a driver imaging module 62, and an occupant monitoring memory 63 that are included in the occupant monitoring apparatus 60.

As illustrated in FIG. 1B, the center imaging module 61 may include an imaging device 65 and an infrared-ray LED 66 that serves as a light-emitting device. The center imaging module 61 may be provided at a middle part of the dashboard 6 that is positioned in front of the occupant. The infrared-ray LED 66 may emit infrared light and may apply the emitted infrared light at a wide angle to the entire region corresponding to a wide angle of view of the imaging device 65 illustrated in FIG. 1B. With this configuration, the imaging device 65 is able to capture an infrared-ray imaging image with the infrared light being applied to the occupant such as the driver present in the region corresponding to the angle of view of the imaging device 65. The infrared-ray imaging image may include an image component such as a retina or a blood vessel of the occupant such as the driver. The light applied by the infrared-ray LED 66 may have a frequency included in a frequency range of natural light or an outdoor light. In this case, a factor such as intensity or a pattern of the light applied by the infrared-ray LED 66 may be adjusted to allow for distinction between the light applied by the infrared-ray LED 66 and the natural light. The imaging device 65 may capture an infrared-ray imaging image with infrared-light application by the infrared-ray LED 66 and may also capture an infrared-ray imaging image without the infrared-light application by the infrared-ray LED 66. Subtracting the infrared-ray imaging image captured without the infrared-light application from the infrared-ray imaging image captured with the infrared-light application results in an imaging image including only an image component derived from the light application by the infrared-ray LED 66.

As illustrated in FIG. 1B, the driver imaging module 62 may include the imaging device 65 and the infrared-ray LED 66 that serves as a light-emitting device. The driver imaging module 62 may be provided at a right part of the dashboard 6 that is positioned in front of the occupant. The right part of the dashboard 6 may be positioned in front of the seat 4 on which the driver sits. The driver imaging module 62 may perform imaging of the driver together with the center imaging module 61. The infrared-ray LED 66 may emit infrared light and may apply the emitted infrared light at a narrow angle to the entire region corresponding to a narrow angle of view of the corresponding imaging device 65 illustrated in FIG. 1B. With this configuration, the imaging device 65 is able to capture an infrared-ray imaging image with the infrared light being applied to the occupant such as the driver present in the region corresponding to the angle of view of the imaging device 65. The infrared-ray imaging image may include an image component such as a retina or a blood vessel of the occupant such as the driver. The application light of the infrared-ray LED 66 of the driver imaging module 62 may have a frequency substantially the same as that of the infrared-ray LED 66 of the center imaging module 61.

The occupant monitoring memory 63 may hold a program for occupant monitoring, setting data, and any other data. The setting data may include personal data for each occupant.

The occupant monitoring ECU 17 may read the program from the occupant monitoring memory 63 and may execute the program. The occupant monitoring ECU 17 may thereby serve as a controller of the occupant monitoring apparatus 60. In one embodiment, the occupant monitoring ECU 17 may serve as a "controller". The occupant monitoring ECU 17 serving as the controller of the occupant monitoring apparatus 60 may control operation of the center imaging module 61 and operation of the driver imaging module 62. For example, the occupant monitoring ECU 17 may cause each of the center imaging module 61 and the driver imaging module 62 to perform imaging repeatedly at a predetermined cycle. The occupant monitoring ECU 17 may acquire, from the center imaging module 61, an imaging image captured by the center imaging module 61 and may acquire, from the driver imaging module 62, an imaging image captured by the driver imaging module 62. The occupant monitoring ECU 17 may analyze the acquired imaging images to recognize and monitor the occupant including the driver present in the vehicle 1.

For example, the occupant monitoring ECU 17 may analyze the acquired imaging images to identify each of the occupants including the driver present in the vehicle 1.

The occupant monitoring ECU 17 may monitor a state of the occupant. For example, the occupant monitoring ECU 17 may monitor a position of an upper body of the occupant or a position of a head of the occupant, as the state of the occupant. Further, the occupant monitoring ECU 17 may monitor a movement of the occupant on the basis of positional variation of the occupant. The occupant monitoring ECU 17 may output data, such as data regarding the position of the upper body of the occupant, data regarding the position of the head of the occupant, or data regarding the movement of the occupant, to any control ECU such as the occupant protection ECU 18.

The occupant monitoring ECU 17 may further monitor, as the state of the occupant: a sleeping state (a drowsy state); an excited state; an inattentive state such as looking in an inappropriate direction; and an emergency state including a so-called dead man, for example. The occupant monitoring ECU 17 may determine the sleeping state on the basis of an inclination of the head or an opening degree of an eye in the captured imaging image, for example. The occupant monitoring ECU 17 may determine the excited state, the emergency state, and the sleeping state on the basis of a pulse wave velocity or an amount of hemoglobin in the retina or the blood vessel in the captured imaging image, for example. The occupant monitoring ECU 17 may determine the inattentive state on the basis of that either of the eyes is not included in the captured imaging image or that eyes are not positioned symmetrically to a nose or a mouth in the captured imaging image, for example. The occupant monitoring ECU 17 may execute programs for determining the respective states in parallel.

The occupant monitoring ECU 17 may output results of such monitoring to any control ECU such as the automatic driving/driving assist ECU 14 or the occupant protection ECU 18 via the vehicle network 25. Upon receiving data regarding the results of the monitoring, the automatic driving/driving assist ECU 14 may execute a control to change a destination of the automatic traveling to a place such as a hospital and to continue the traveling, or may execute a control to perform emergency stop and to stop the vehicle 1 at a place such as a side of a road or a parking lot.

The occupant protection ECU 18 may be coupled to an air bag device 71 and a seat belt device 72 that are included in the occupant protecting apparatus 70.

The air bag device 71 may be, for example: a font air bag device including an air bag that is to be inflated in front of the occupant sitting on the seat 4; a side air bag device including an air bag that is to be inflated on an outer side of the occupant; a far-side air bag device including an air bag that is to be inflated between adjacent occupants; or a curtain air bag device including an air bag that is to be inflated on an inner side of a glass surface of the body 2.

The seat belt device 72 may include a seat belt that is to be fastened around the occupant sitting on the seat 4.

Upon prediction or detection of contact of the vehicle 1 with another object, the occupant protection ECU 18 may activate the air bag device 71 and the seat belt device 72 to execute occupant protection control.

For example, the occupant protection ECU 18 may acquire, from the occupant monitoring ECU 17, data regarding the state of the occupant such as a current position of the head of the occupant. On the basis of the acquired data, the occupant protection ECU 18 may so change settings including, without limitation, a position to start inflating the air bag, a direction to inflate the air bag, a speed to inflate the air bag, intensity to inflate the air bag, a timing to start restraining the occupant with the seat belt, intensity or a limit of the restraining, and a period of the restraining, that the settings be appropriate for the current state of the occupant such as the current position of the head of the occupant.

Upon the detection of the contact of the vehicle 1 with another object, the occupant protection ECU 18 may activate the air bag device 71 and the seat belt device 72 on the basis of the setting at the time of the detection of the contact.

In the control system 10 of the vehicle 1, the occupant monitoring apparatus 60 may use a light-emitting device such as the infrared-ray LED 66 to perform imaging of the occupant.

Figure 3:
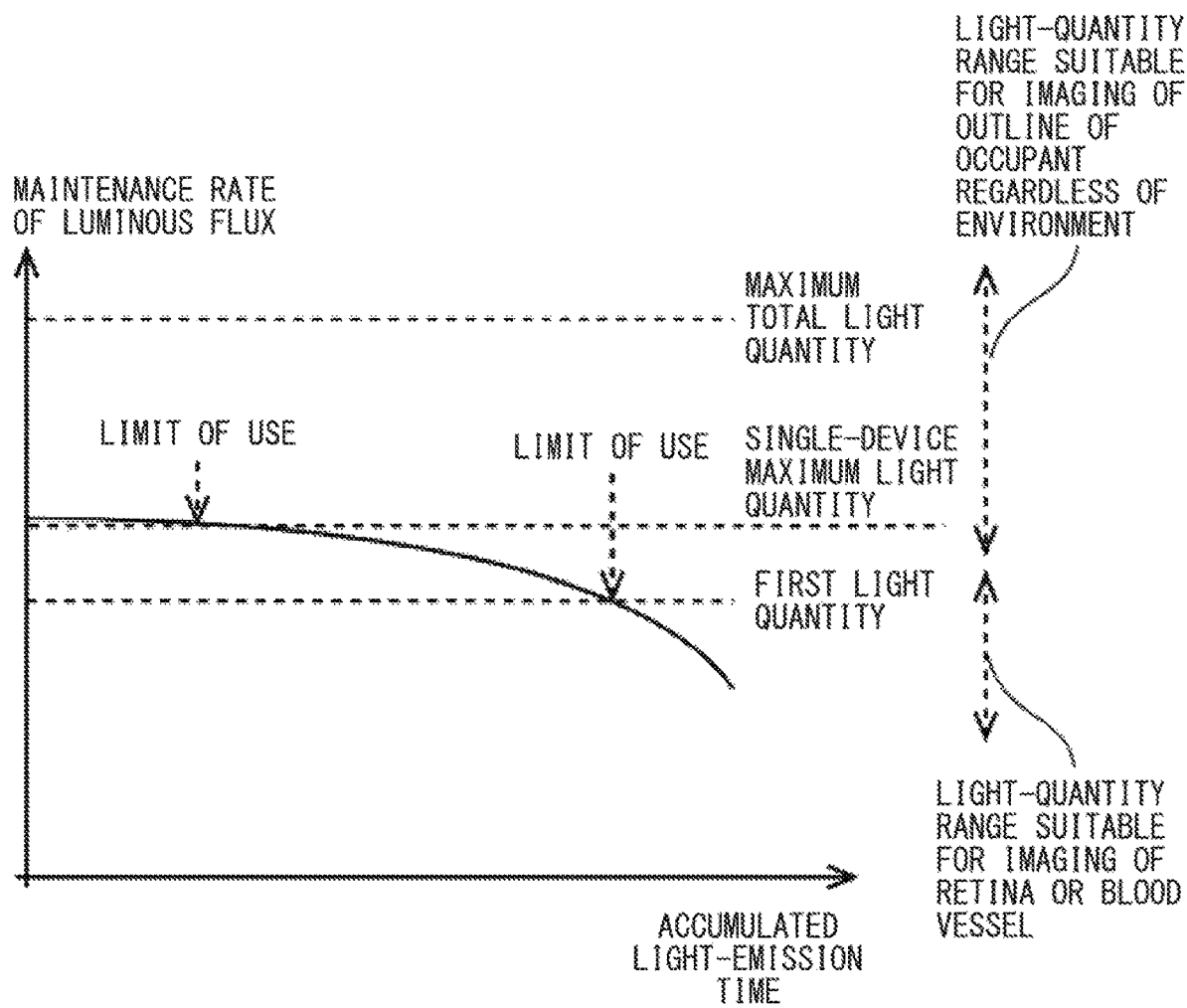
FIG. 3 is a diagram illustrating an example of a light-emission characteristic of an infrared-ray LED illustrated in FIG. 1.

FIG. 3 illustrates an example of a light-emission characteristic of the infrared-ray LED 66 illustrated in FIG. 1B.

In FIG. 3, a horizontal axis represents an accumulated light-emission time corresponding to a life of the infrared-ray LED 66, and a vertical axis represents a maintenance rate of a luminous flux of the light emitted by the infrared-ray LED 66.

As illustrated in FIG. 3, when a light quantity of light emission by the infrared-ray LED 66 increases, the accumulated light-emission time for which the infrared-ray LED 66 is usable at the light quantity decreases. A limit of use at a single-device maximum light quantity is shorter in time than a limit of use at a first light quantity which is less than the single-device maximum light quantity, as illustrated in FIG. 3. The first light quantity may be within a light-quantity range suitable for imaging of a part such as a retina or a blood vessel. The lower light quantity of light emission by the infrared-ray LED 66 may be more favorable.

The accumulated light-emission time may be an accumulated time of the light emission performed by the infrared-ray LED 66. Therefore, the infrared-ray LED 66 may be preferably turned off when the light emission by the infrared-ray LED 66 is unnecessary.

On the other hand, in some situations, brightness inside the vehicle 1 can be varied by an environment in which the vehicle 1 is traveling, or light outside the vehicle 1 can be applied to the occupant. In order to capture a clear image of a part such as an outline of the occupant even in such situations, it may be desired for the infrared-ray LED 66 to apply relatively-strong light to the occupant. In order to precisely monitor the state of the occupant such as the position of the occupant on the basis of data of a part such as the outline of the occupant in the captured imaging image, it may be desired for the infrared-ray LED 66 to apply relatively-strong light to the occupant.

An increase in the single-device maximum light quantity of the infrared-ray LED 66 can result in an increase in size of the infrared-ray LED 66. The large-sized infrared-ray LED 66 can require a high output and can therefore require a greater current than the small-sized infrared-ray LED 66. Electric power consumption or a heat generation amount of the infrared-ray LED 66 can increase at a rate proportional to the square of the current. Further, a heatsink for cooling the infrared-ray LED 66 can also increase in size.

In order to obtain a light quantity necessary for imaging of a part such as the outline of the occupant regardless of an environment of the imaging, it may be necessary to use the high-output infrared-ray LED 66, as illustrated in FIG. 3. This can lead to the concerns described above. In a case of using the intermediate-output infrared-ray LED 66 at a light quantity close to the single-device maximum light quantity, the accumulated light-emission time can decrease and the light quantity can be insufficient at a earlier timing, leading to more-frequent exchange of the infrared-ray LED 66.

Moreover, in a case where the infrared-ray LED 66 applies relatively-strong light to the occupant, it is more difficult to perform favorable imaging of a part such as the retina or the blood vessel of the occupant. A light-quantity range suitable for imaging of a part such as the retina or the blood vessel is lower than a light-quantity range suitable for imaging of the outline of the occupant, regardless of an environment in which the imaging is performed, and the two light-quantity ranges often do not overlap each other.

According to the example embodiment of the technology, a control is performed in a devised way to comprehensively solve the concerns and to improve the operation of the occupant monitoring apparatus 60 of the vehicle 1. This is described in detail below.

Figure 4:
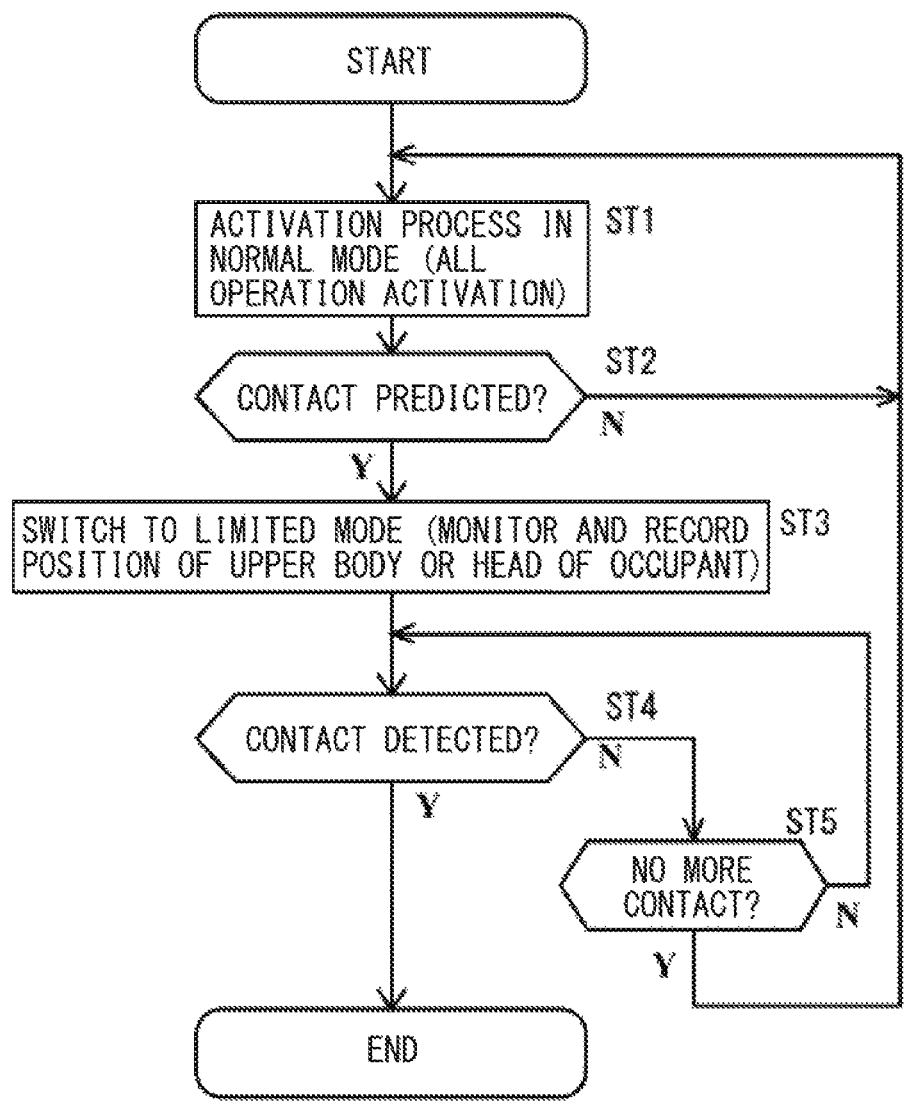
FIG. 4 is a flowchart illustrating an example of a process of switching an operation mode of an occupant monitoring ECU illustrated in FIG. 2.

FIG. 4 is a flowchart illustrating an example of a process of switching an operation mode of the occupant monitoring ECU 17 illustrated in FIG. 2. Upon activation of the vehicle 1, the occupant monitoring ECU 17 serving as the controller of the occupant monitoring apparatus 60 may repeatedly execute the process illustrated in FIG. 4. The occupant monitoring ECU 17 may repeatedly execute the process illustrated in FIG. 4 while the vehicle 1 is traveling.

In step ST1, the occupant monitoring ECU 17 may first activate the occupant monitoring apparatus 60 in a normal mode. In the normal mode, the occupant monitoring ECU 17 may allow all types of operation of the occupant monitoring apparatus 60 to be executable. For example, the occupant monitoring ECU 17 may monitor a position of a part such as the upper body or the head of the occupant on the basis of the imaging image captured by the center imaging module 61. The occupant monitoring ECU 17 may also monitor the riding state such as the sleeping state, the excited state, or the inattentive state of the occupant on the basis of the imaging image captured by the driver imaging module 62. The occupant monitoring ECU 17 may monitor the state of the occupant on the basis of a part such as the retina or the blood vessel of the occupant in the imaging image captured by the driver imaging module 62.

In step ST2, the occupant monitoring ECU 17 may determine whether the contact of the vehicle 1 with another object has been predicted. The detection ECU 16 may analyze an image of the outside environment obtained by the stereo camera 43 to predict the contact of the vehicle 1 with another mobile body present around the vehicle 1. In a case where the occupant monitoring ECU 17 has acquired data regarding the prediction of the contact of the vehicle 1, the occupant monitoring ECU 17 may determine that the contact of the vehicle 1 with another object has been predicted (Y in step ST2), and may cause the process to proceed to step ST3. In a case where the contact of the vehicle 1 with another object has not been predicted (N in step ST2), the occupant monitoring ECU 17 may cause the process to return to step ST1. The occupant monitoring ECU 17 may continue to operate in the normal mode until the contact of the vehicle 1 with another object is predicted.

In step ST3, the occupant monitoring ECU 17 may switch the operation mode of the occupant monitoring apparatus 60 from the normal mode set upon the activation of the occupant monitoring apparatus 60 to a limited mode. In the limited mode, the occupant monitoring ECU 17 may allow only part of the operation of the occupant monitoring apparatus 60 to be executable. For example, the occupant monitoring ECU 17 may only execute operation which is to be necessary after the prediction of the contact of the vehicle 1 with another object. In this non-limiting example, the occupant monitoring ECU 17 may only execute operation of monitoring and recording the position of a part such as the upper body or the head of the occupant on the basis of the imaging image captured by the center imaging module 61. Further, as will be described later, the occupant monitoring ECU 17 may cause the center imaging module 61 and the driver imaging module 62 to perform imaging at a higher speed and at a shorter cycle in the limited mode, as compared with a case in the normal mode. In this case, the imaging image captured by the driver imaging module 62 may not be used. The occupant monitoring ECU 17 may stop monitoring the state of the occupant on the basis of the retina or the blood vessel of the occupant, and may monitor only the position of the head of the occupant at a short cycle only on the basis of the imaging image captured at a high speed by the single imaging device 65.

In step ST4, the occupant monitoring ECU 17 may determine whether the contact of the vehicle 1 with another object has been detected. The detection ECU 16 may detect the contact of the vehicle 1 with another object when the acceleration sensor 42 detects a high acceleration rate of the predetermined value or greater. In a case where the occupant monitoring ECU 17 has acquired data regarding the detection of the contact of the vehicle 1, the occupant monitoring ECU 17 may determine that the contact of the vehicle 1 with another object has been detected (Y in step ST4), and may bring the process illustrated in FIG. 4 to an end. On this occasion, the occupant monitoring ECU 17 may record, in the occupant monitoring memory 63, monitoring data of the occupant used to determine the detection of the contact of the vehicle 1. Further, the occupant monitoring ECU 17 may monitor the occupant in a predetermined period after the detection of the contact of the vehicle 1. The occupant monitoring ECU 17 may record monitoring data after the detection of the contact of the vehicle 1 in the occupant monitoring memory 63. In a case where the occupant monitoring ECU 17 has not acquired the data regarding the detection of the contact of the vehicle 1 (N in step ST4), the occupant monitoring ECU 17 may cause the process to proceed to step ST5.

In step ST5, the occupant monitoring ECU 17 may determine whether the vehicle 1 is not in contact with the other object anymore. For example, in a case where the occupant monitoring ECU 17 does not acquire data regarding new prediction of contact of the vehicle 1 from the detection ECU 16, the occupant monitoring ECU 17 may determine that the vehicle 1 is not in contact with the other object anymore (Y in step ST5), and may cause the process to return to step ST1. For example, in a case where the occupant monitoring ECU 17 continuously acquires data regarding new prediction of contact of the vehicle 1 from the detection ECU 16, the occupant monitoring ECU 17 may determine that the vehicle 1 is still in contact with the other object (N in step ST5), and may cause the process to return to step ST4.

Figure 5:
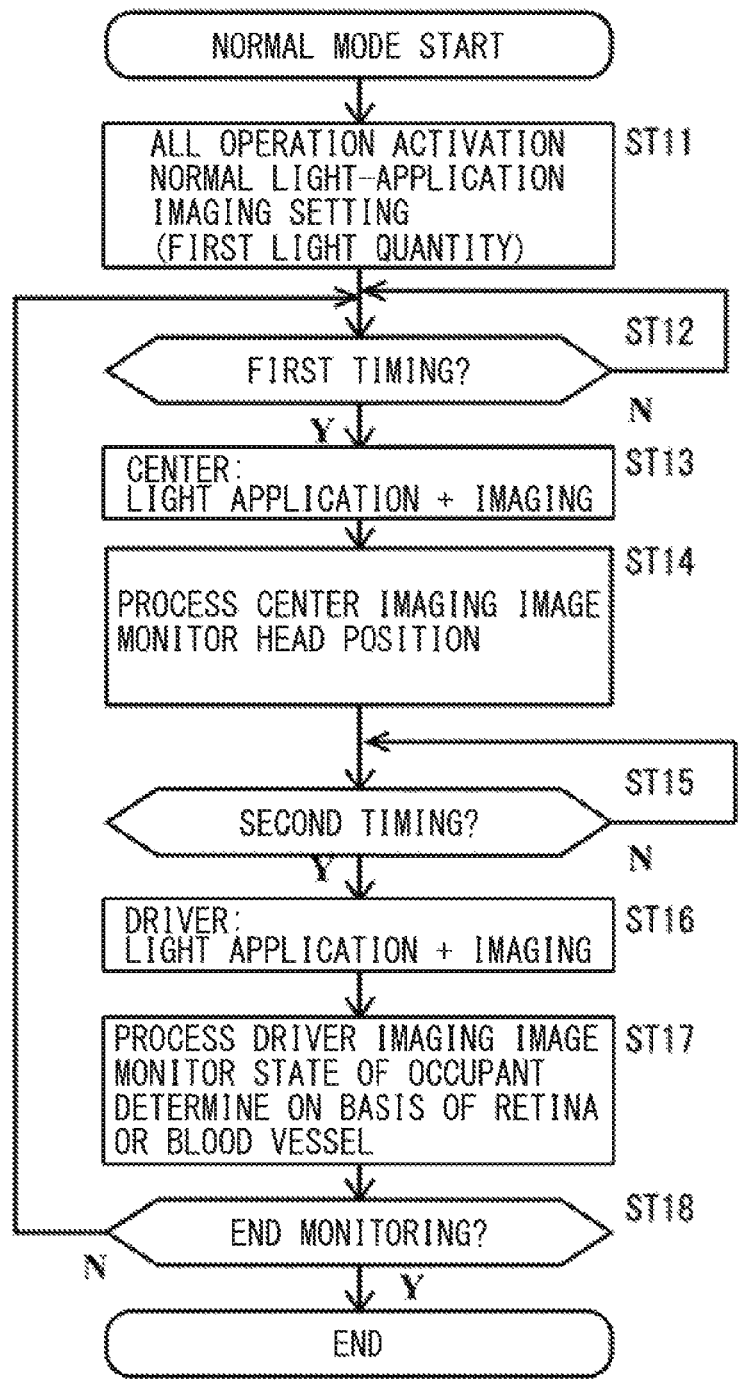
FIG. 5 is a flowchart illustrating an example of a process in a normal mode illustrated in FIG. 4.

FIG. 5 is a flowchart illustrating an example of a process in the normal mode described in FIG. 4.

In a case where the occupant monitoring ECU 17 activates the occupant monitoring apparatus 60 and causes the occupant monitoring apparatus 60 to operate in the normal mode, the occupant monitoring ECU 17 serving as the controller of the occupant monitoring apparatus 60 may repeatedly execute the process illustrated in FIG. 5.

The occupant monitoring ECU 17 may perform the process illustrated in FIG. 5 to monitor the state of the occupant on the basis of two or more imaging images obtained by respective two or more imaging devices 65 in the imaging modules.

In step ST11, the occupant monitoring ECU 17 may configure an initial setting to cause the occupant monitoring apparatus 60 to operate in the normal mode. For example, the occupant monitoring ECU 17 may activate all types of the operation of the occupant monitoring apparatus 60 and may allow all types of the operation of the occupant monitoring apparatus 60 to be executable. The occupant monitoring ECU 17 may so set the center imaging module 61 and the driver imaging module 62 that the center imaging module 61 and the driver imaging module 62 perform imaging independently of each other at different timings which do not coincide with each other in a predetermined cycle set for repetitive imaging and monitoring. The occupant monitoring ECU 17 may so set the infrared-ray LED 66 of the center imaging module 61 and the infrared-ray LED 66 of the driver imaging module 62 that the infrared-ray LED 66 of the center imaging module 61 and the infrared-ray LED 66 of the driver imaging module 62 emit light only at their own imaging timings. The occupant monitoring ECU 17 may also set the light quantity of the light emission of the infrared-ray LED 66 of the center imaging module 61 and the infrared-ray LED 66 of the driver imaging module 62 to the first light quantity.

In step ST12, the occupant monitoring ECU 17 may determine whether it has reached a first timing at which the center imaging module 61 is caused to perform imaging. In a case where it has not reached the first timing yet (N in step ST12), the occupant monitoring ECU 17 may repeat the process in step ST12. In a case where it has reached the first timing (Y in step ST12), the occupant monitoring ECU 17 may cause the process to proceed to step ST13.

In step ST13, the occupant monitoring ECU 17 may cause the center imaging module 61 to perform light emission by the infrared-ray LED 66 and to perform an imaging process by the imaging device 65. The infrared-ray LED 66 may start emitting light at the first light quantity, and may stop emitting the light when the imaging device 65 completes the imaging process. The infrared-ray LED 66 may perform the light emission at the suppressed first light quantity that allows for imaging of a part such as the retina or the blood vessel of the occupant.

In step ST14, the occupant monitoring ECU 17 may acquire an imaging image captured by the center imaging module 61 in step ST13, and may execute a monitoring process. The occupant monitoring ECU 17 may determine a current position of the head of the occupant in the vehicle 1 on the basis of a position of the head of the occupant in the captured imaging image. The occupant monitoring ECU 17 may transmit data regarding the determined current position of the head of the occupant to the occupant protection ECU 18.

In step ST15, the occupant monitoring ECU 17 may determine whether it has reached a second timing at which the driver imaging module 62 is caused to perform imaging. In a case where it has not reached the second timing yet (N in step ST15), the occupant monitoring ECU 17 may repeat the process in step ST15. In a case where it has reached the second timing (Y in step ST15), the occupant monitoring ECU 17 may cause the process to proceed to step ST16.

In step ST16, the occupant monitoring ECU 17 may cause the driver imaging module 62 to perform light emission by the infrared-ray LED 66 and to perform an imaging process by the imaging device 65. The infrared-ray LED 66 may start emitting light at the first light quantity, and may stop emitting the light when the imaging device 65 completes the imaging process. The infrared-ray LED 66 may perform the light emission at the suppressed first light quantity that allows for imaging of a part such as the retina or the blood vessel of the occupant.

In step ST17, the occupant monitoring ECU 17 may acquire an imaging image captured by the driver imaging module 62 in step ST16, and may execute a monitoring process. The occupant monitoring ECU 17 may also similarly execute the monitoring process regarding the imaging image captured by the center imaging module 61 in step ST13. The occupant monitoring ECU 17 may determine the riding state of the occupant on the basis of a part such as the retina or the blood vessel of the occupant in the imaging image. In a case where the occupant is not in a state of being able to drive the vehicle 1, the occupant monitoring ECU 17 may transmit data regarding the determined riding state to any control ECU such as the automatic driving/driving assist ECU 14, the external communication ECU 19, or the UIECU 20.

The automatic driving/driving assist ECU 14 may switch the traveling of the vehicle 1 in accordance with the riding state of the occupant. The external communication ECU 19 may further transmit the data regarding the riding state of the occupant to any device such as the server 102 or the other vehicle 110. The UIECU 20 may output, from any device such as the display device 51, a warning based on the riding state of the occupant.

In step ST18, the occupant monitoring ECU 17 may determine whether the monitoring is to be ended. For example, in a case where the vehicle 1 has arrived at a destination and the occupant has get out of the vehicle 1, the occupant monitoring ECU 17 may determine that the monitoring is to be ended (Y in step ST18), and may bring the process illustrated in FIG. 5 to an end. In a case where the occupant monitoring ECU 17 does not determine that the monitoring is to be ended (N in step ST18), the occupant monitoring ECU 17 may cause the process to return to step ST12. The occupant monitoring ECU 17 may repeatedly perform the processes from step ST12 to step ST18 for each predetermined imaging cycle in the normal mode, thereby causing the center imaging module 61 and the driver imaging module 62 to perform the imaging in turn. The infrared-ray LED 66 of the center imaging module 61 may emit light and may apply the light only in a period in which the imaging device 65 of the center imaging module 61 performs the imaging. The infrared-ray LED 66 of the driver imaging module 62 may emit light and may apply the light only in a period in which the imaging device 65 of the driver imaging module 62 performs the imaging.

As described above, in the case where the contact of the vehicle 1 with another object is not predicted or detected, the occupant monitoring ECU 17 may cause the imaging devices 65 of the respective imaging modules to perform the imaging at respective timings different from each other, and may thereby cause the infrared-ray LEDs 66 of the respective imaging modules to emit the light at the respective timings different from each other.

Figure 6:
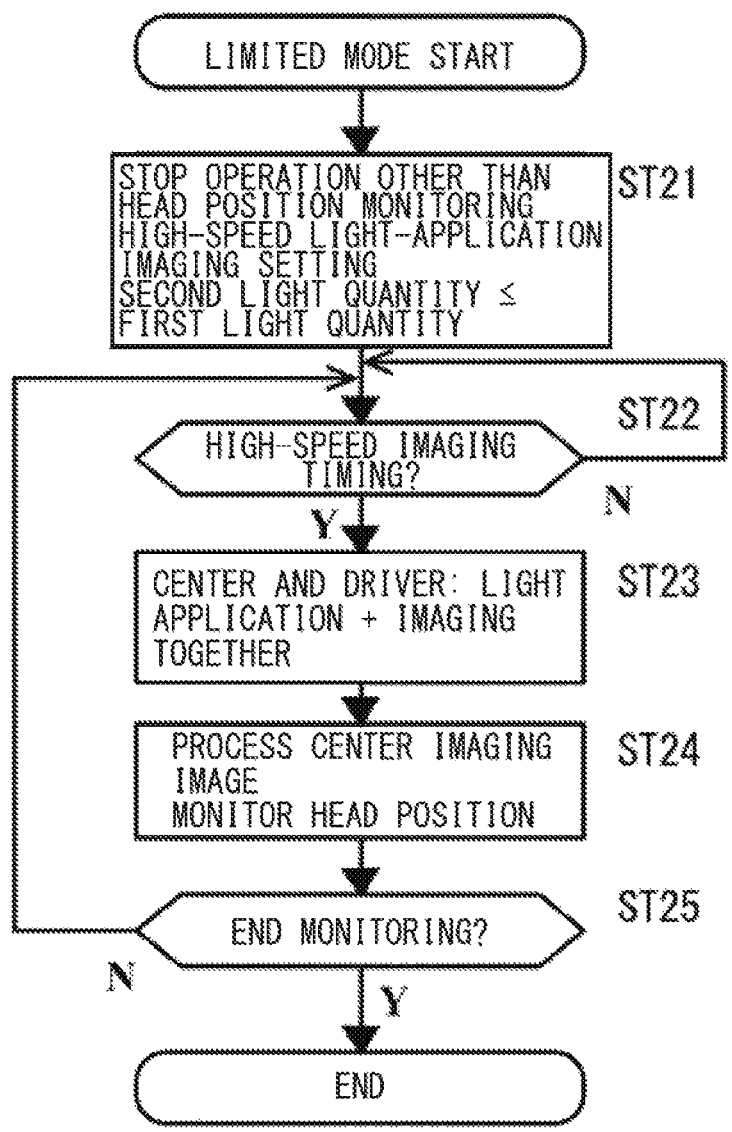
FIG. 6 is a flowchart illustrating an example of a process in a limited mode illustrated in FIG. 4.

FIG. 6 is a flowchart illustrating an example of a process in the limited mode described in FIG. 4.

In a case where the occupant monitoring ECU 17 causes the occupant monitoring apparatus 60 to operate in the limited mode, the occupant monitoring ECU 17 serving as the controller of the occupant monitoring apparatus 60 may repeatedly execute the process illustrated in FIG. 6.

The occupant monitoring ECU 17 may perform the process illustrated in FIG. 6 to monitor the current position of the head of the occupant on the basis of the imaging image captured by the imaging device 65 of the center imaging module 61.

In step ST21, the occupant monitoring ECU 17 may configure an initial setting to cause the occupant monitoring apparatus 60 to operate in the limited mode. For example, the occupant monitoring ECU 17 may allow only part of the operation of the occupant monitoring apparatus 60 to be executable. In this example, the occupant monitoring ECU 17 may allow only operation of monitoring the current position of the head of the occupant to be executable. The occupant monitoring ECU 17 may so set the center imaging module 61 and the driver imaging module 62 that the center imaging module 61 and the driver imaging module 62 perform imaging together at substantially the same timing in a predetermined light-application imaging cycle shorter than that in the normal mode. The occupant monitoring ECU 17 may so set the infrared-ray LED 66 of the center imaging module 61 and the infrared-ray LED 66 of the driver imaging module 62 that the infrared-ray LED 66 of the center imaging module 61 and the infrared-ray LED 66 of the driver imaging module 62 emit light only at their own imaging timings. The occupant monitoring ECU 17 may also set the light quantity of the light emission of the infrared-ray LED 66 of the center imaging module 61 and the infrared-ray LED 66 of the driver imaging module 62 to a second light quantity that is equal to or less than the first light quantity. Setting the second light quantity to be equal to or greater than the half of the first light quantity allows a total light quantity of the infrared-ray LED 66 of the center imaging module 61 and the infrared-ray LED 66 of the driver imaging module 62 to be equal to or greater than the first light quantity. Because the light quantity of the light emission performed by each of the infrared-ray LEDs 66 in the limited mode is not greater than the light quantity of the light emission performed by each of the infrared-ray LEDs 66 in the normal mode, even if the light quantity of each of the infrared-ray LEDs 66 is switched for operation when the contact of the vehicle 1 with another object is predicted or detected, each of the infrared-ray LEDs 66 may not be deteriorated or decreased in its life.

In step ST22, the occupant monitoring ECU 17 may determine whether it has reached a high-speed imaging timing at which the driver imaging module 62 and the center imaging module 61 are caused to perform imaging together. In a case where it has not reached the high-speed imaging timing yet (N in step ST22), the occupant monitoring ECU 17 may repeat the process in step ST22. In a case where it has reached the high-speed imaging timing (Y in step ST22), the occupant monitoring ECU 17 may cause the process to proceed to step ST23.

In step ST23, the occupant monitoring ECU 17 may cause each of the driver imaging module 62 and the center imaging module 61 to perform the light emission by the infrared-ray LED 66 and to perform the imaging process by the imaging device 65. The infrared-ray LED 66 of the driver imaging module 62 and the infrared-ray LED 66 of the center imaging module 61 may each start emitting light at the first light quantity, and may each stop emitting the light when the corresponding imaging device 65 completes the imaging process. The total light quantity of the light applied to the occupant may be equal to or greater than the first light quantity, which is appropriate for the imaging of a part such as the outline of the occupant regardless of the environment in which the imaging is performed.

In step ST24, the occupant monitoring ECU 17 may acquire an imaging image captured by the center imaging module 61 in step ST23, and may execute a monitoring process. The occupant monitoring ECU 17 may determine the current position of the head of the occupant in the vehicle 1 on the basis of a position of the head of the occupant in the captured imaging image. The occupant monitoring ECU 17 may transmit data regarding the determined current position of the head of the occupant to the occupant protection ECU 18.

In step ST25, the occupant monitoring ECU 17 may determine whether the monitoring is to be ended. For example, in a case where the vehicle 1 has arrived at a destination and the occupant has get out of the vehicle 1, the occupant monitoring ECU 17 may determine that the monitoring is to be ended (Y in step ST25), and may bring the process illustrated in FIG. 6 to an end. In a case where the occupant monitoring ECU 17 does not determine that the monitoring is to be ended (N in step ST25), the occupant monitoring ECU 17 may cause the process to return to step ST22. The occupant monitoring ECU 17 may repeatedly perform the processes from step ST22 to step ST25 for each high-speed imaging cycle in the limited mode, thereby causing the center imaging module 61 and the driver imaging module 62 to perform the imaging together. The infra-red-ray LED 66 of the center imaging module 61 and the infrared-ray LED 66 of the driver imaging module 62 may emit light together, thereby applying light having the total light quantity equal to or greater than the first light quantity to the occupant. This allows the imaging device 65 of the center imaging module 61 to perform imaging of the occupant with such strong light being applied to the occupant.

As described above, in the case where the contact of the vehicle 1 with another object is predicted or detected, the occupant monitoring ECU 17 may cause the two or more infrared-ray LEDs 66 of the respective imaging modules to emit light together at substantially the same timing.

Figure 7:
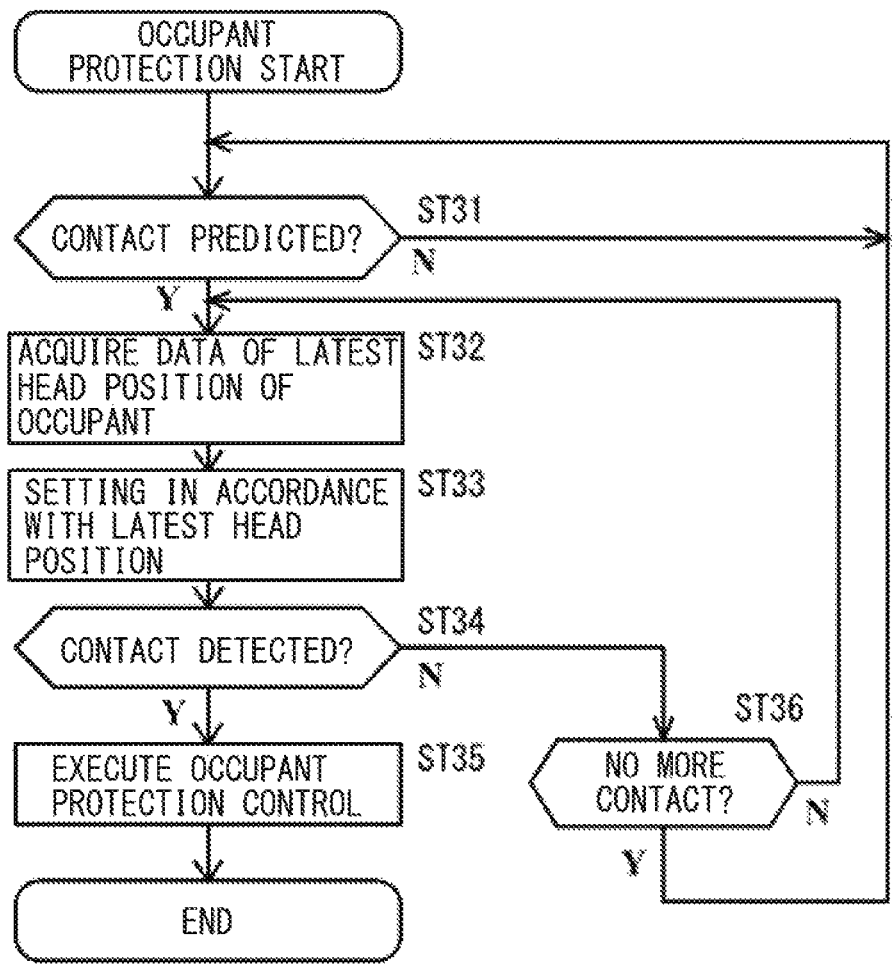
FIG. 7 is a flowchart illustrating an example of a process of an occupant protection ECU illustrated in FIG. 2.

FIG. 7 is a flowchart illustrating an example of a process of the occupant protection ECU 18 illustrated in FIG. 2.

Upon activation of the vehicle 1, the occupant protection ECU 18 serving as the controller of the occupant protecting apparatus 70 may repeatedly execute the process illustrated in FIG. 7. The occupant protection ECU 18 may repeatedly execute the process illustrated in FIG. 7 while the vehicle 1 is traveling.

In step ST31, the occupant protection ECU 18 may determine whether contact of the vehicle 1 with another object has been predicted. The detection ECU 16 may analyze an image of the outside environment obtained by the stereo camera 43 to predict contact of the vehicle 1 with another mobile body present around the vehicle 1. In a case where the occupant protection ECU 18 has acquired data regarding the prediction of the contact of the vehicle 1, the occupant protection ECU 18 may determine that the contact of the vehicle 1 with another object has been predicted (Y in step ST31), and may cause the process to proceed to step ST32. In a case where the contact of the vehicle 1 with another object has not been predicted (N in step ST31), the occupant protection ECU 18 may repeat the process in step ST31.

In step ST32, the occupant protection ECU 18 may acquire data regarding a latest position of the head of the occupant. The occupant monitoring ECU 17 may acquire the data regarding the latest position of the occupant on the basis of cyclic imaging of the occupant. The occupant protection ECU 18 may acquire the data regarding the latest position of the head of the occupant from the occupant monitoring ECU 17.

In step ST33, the occupant protection ECU 18 may set the operation of the occupant protecting apparatus 70 on the basis of the acquired data regarding the latest head position of the occupant. The occupant protection ECU 18 may so adjust the settings of the operation of the occupant protecting apparatus 70 on the basis of the data regarding the latest position of the head of the occupant acquired from the occupant monitoring ECU 17 that the upper body and the head of the occupant are supported from a direction into which the occupant is to incline due to the contact of the vehicle 1 with another object. The settings to be adjusted by the occupant protection ECU 18 may include, without limitation, the position to start inflating the air bag, the direction to inflate the air bag, the speed to inflate the air bag, and the intensity to inflate the air bag. The settings to be adjusted by the occupant protection ECU 18 may further include, without limitation, the timing to start restraining the occupant with the seat belt, the intensity or the limit of the restraining, and the period of the restraining.

Note that, in one non-limiting example, the occupant protection ECU 18 may execute the process in step ST31 after the processes in step ST32 and step ST33. In this case, if the contact of the vehicle 1 with another object has not been predicted in step ST31, the occupant protection ECU 18 may cause the process to return to step ST32.

In step ST34, the occupant protection ECU 18 may determine whether the contact of the vehicle 1 with another object has been detected. The detection ECU 16 may detect the contact of the vehicle 1 with another object on the basis of a value detected by the acceleration sensor 42. In a case where the occupant protection ECU 18 has acquired data regarding the detection of the contact of the vehicle 1, the occupant protection ECU 18 may determine that the contact of the vehicle 1 with another object has been detected (Y in step ST34), and may cause the process to proceed to step ST35. In a case where the contact of the vehicle 1 with another object has not been detected (N in step ST34), the occupant protection ECU 18 may cause the process to proceed to step ST36.

In step ST35, the occupant protection ECU 18 may execute occupant protection control. The occupant protection ECU 18 may activate the air bag device 71 and the seat belt device 72 on the basis of the respective settings. The seat belt may exert force to restrain the occupant to the seat 4, and the air bag may be inflated around the occupant. The seat belt and the air bag may thereby absorb an influence on the occupant.

In step ST36, the occupant protection ECU 18 may determine whether the vehicle 1 is not in contact with the other object anymore. For example, in a case where the occupant protection ECU 18 does not acquire data regarding new prediction of the contact of the vehicle 1 from the detection ECU 16, the occupant protection ECU 18 may determine that the vehicle 1 is not in contact with the other object anymore (Y in step ST36), and may cause the process to return to step ST31. For example, in a case where the occupant protection ECU 18 continuously acquires information regarding new prediction of the contact of the vehicle 1 from the detection ECU 16, the occupant protection ECU 18 may determine that the vehicle 1 is still in contact with the other object (N in step ST36), and may cause the process to return to step ST32.

Figure 8:
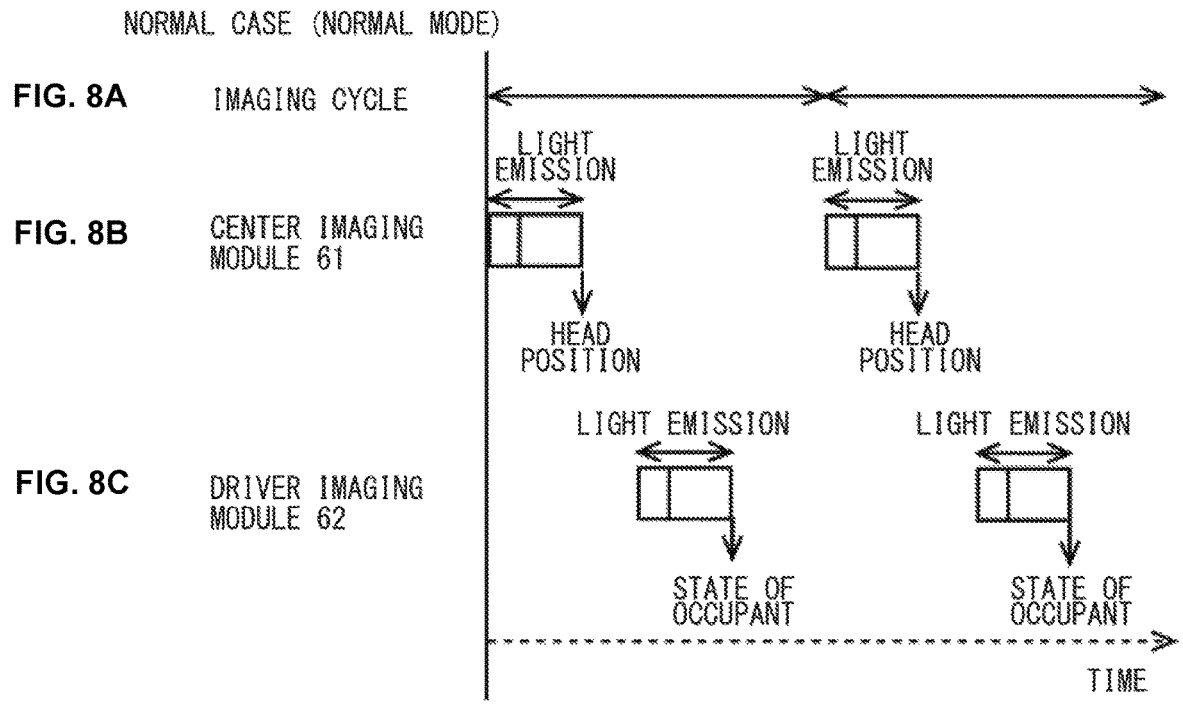
FIGS. 8A-8F are a timing chart describing an example of operation states of a driver imaging module and a center imaging module.
Figure 8:
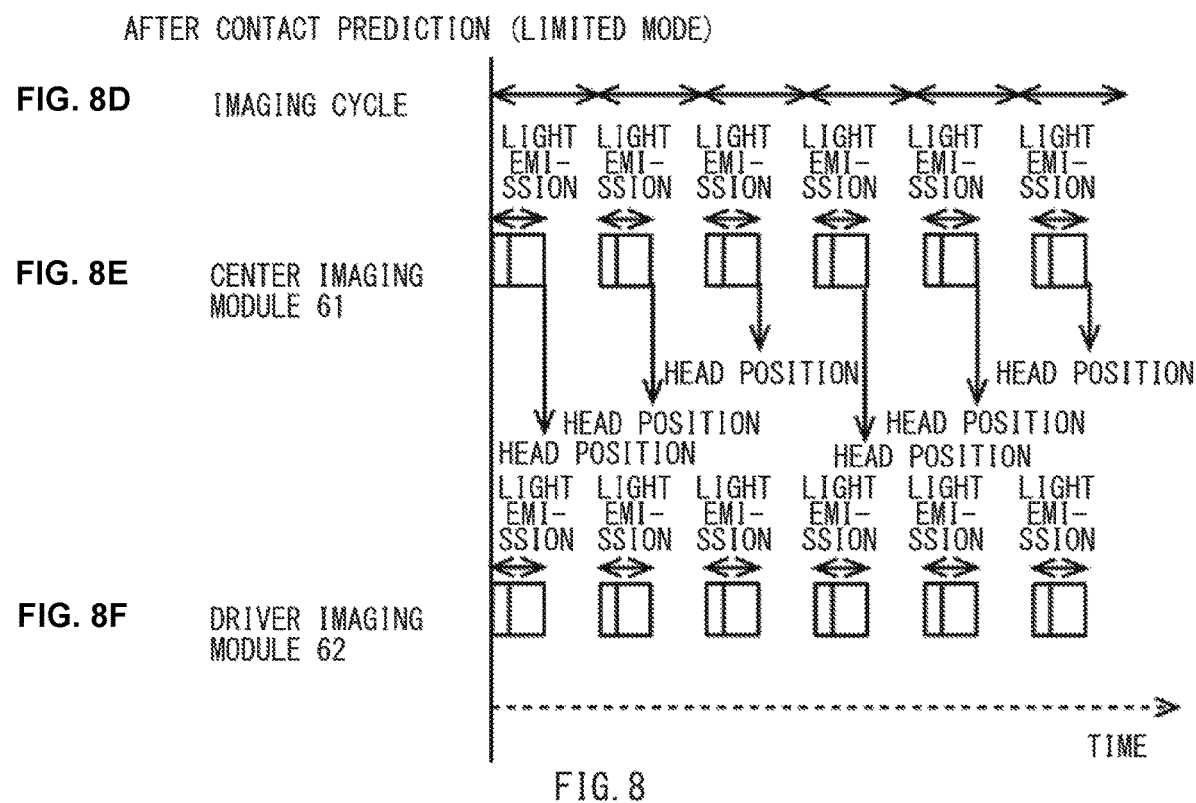

FIG. 8 is a timing chart illustrating the operation states of the center imaging module 61 and the driver imaging module 62.

(A) to (C) of FIG. 8 configure the timing chart in the normal mode. (A) of FIG. 8 illustrates a light-application imaging cycle in the normal mode. (B) of FIG. 8 illustrates light-application imaging operation of the center imaging module 61. (C) of FIG. 8 illustrates light-application imaging operation of the driver imaging module 62. Elapse of time is in a direction from left to right.

(D) to (F) of FIG. 8 configure the timing chart in the limited mode. (D) of FIG. 8 illustrates a light-application imaging cycle in the limited mode. (E) of FIG. 8 illustrates light-application imaging operation of the center imaging module 61. (F) of FIG. 8 illustrates light-application imaging operation of the driver imaging module 62. Elapse of time is in a direction from left to right.

In the normal mode, as illustrated in (A) of FIG. 8, the center imaging module 61 and the driver imaging module 62 may repeatedly perform light application and imaging at a relatively-long cycle. As illustrated in (B) of FIG. 8, the center imaging module 61 may start applying light to the occupant from the first timing which is the start of each cycle, and may perform the imaging of the occupant. As illustrated in (C) of FIG. 8, the driver imaging module 62 may start applying light to the occupant from the second timing which is in the middle of each cycle, and may perform the imaging of the occupant.

In this non-limiting example, the center imaging module 61 and the driver imaging module 62 may each perform high dynamic range (HDR) imaging. Therefore, the center imaging module 61 and the driver imaging module 62 may each capture two images in single imaging. The two images may be combined with each other to obtain an HDR image with an increased dynamic range. As illustrated in FIG. 8, a light-application period of the center imaging module 61 and a light-application period of the driver imaging module 62 may not overlap each other. In this case, the imaging device 65 of the center imaging module 61 and the imaging device 65 of the driver imaging module 62 may each use only the light having the first light quantity applied from the corresponding infrared-ray LED 66 to perform imaging of the occupant. Accordingly, it is possible to perform imaging appropriate for a part such as the retina or the blood vessel of the occupant.

In the limited mode, as illustrated in (D) of FIG. 8, the center imaging module 61 and the driver imaging module 62 may repeatedly perform the light application and the imaging at a high speed at a relatively-short cycle. As illustrated in (E) of FIG. 8, the center imaging module 61 may start applying light to the occupant from the high-speed imaging timing which is the start of each cycle, and may perform the imaging of the occupant. As illustrated in (F) of FIG. 8, the driver imaging module 62 may start applying light to the occupant from the high-speed imaging timing which is the start of each cycle, and may perform the imaging of the occupant. The light-application period of the center imaging module 61 and the light-application period of the driver imaging module 62 may overlap each other. In this case, the imaging device 65 of the center imaging module 61 and the imaging device 65 of the driver imaging module 62 may perform imaging of the occupant with light application from the two infrared-ray LEDs 66 of the center imaging module 61 and the driver imaging module 62. That is, the imaging device 65 of the center imaging module 61 and the imaging device 65 of the driver imaging module 62 may perform imaging of the occupant with application of light having the light quantity equal to or greater than the first light quantity. Accordingly, it is possible to perform imaging appropriate for a part such as the outline of the occupant.

In addition, the center imaging module 61 and the driver imaging module 62 may repeatedly perform the imaging at a high speed at the cycle shorter than that in the normal mode. This allows the latest position of the head of the occupant to be updated almost in real time on the basis of the captured imaging image.

As described above, according to the example embodiment, the center imaging module 61 and the driver imaging module 62 may each include the imaging device 65 and the infrared-ray LED 66 serving as the light-emitting device. The center imaging module 61 and the driver imaging module 62 may each cause the infrared-ray LED 66 to perform light application when the imaging device 65 performs imaging. In a case where the contact of the vehicle 1 with another object is predicted or detected, the imaging devices 65 of the two or more imaging modules (i.e., the center imaging module 61 and the driver imaging module 62) may be caused to perform the imaging of the occupant together while the infrared-ray LEDs 66 of the imaging modules may be caused to apply the light to the occupant together. With this configuration, in a case where the contact of the vehicle 1 with another object is predicted or detected, the occupant is illuminated brightly with the light applied from two or more infrared-ray LEDs 66. Imaging of the occupant in such a state allows a part such as the outline of the occupant to be clear in the captured imaging image. As a result, it is possible to precisely specify the state of the occupant such as the position of the occupant on the basis of the imaging image, according to the example embodiment. Further, on the basis of the state of the occupant such as the position of the occupant specified by the occupant monitoring apparatus 60 of the vehicle 1 according to the example embodiment, another device of the vehicle 1 such as the occupant protecting apparatus 70 is allowed to appropriately execute the protection control for the occupant in accordance with the precise state of the occupant such as the precise position of the occupant.

Moreover, according to the example embodiment, the total light quantity of the light applied to the occupant is allowed to be increased without increasing the light quantity of the light emission of each of the infrared-ray LEDs 66. This completely or partially prevent deterioration of each of the infrared-ray LEDs 66 due to an increase in light quantity after returning from a state at the time when the contact of the vehicle 1 with another object is predicted or detected to a state at the time when the contact of the vehicle 1 with the other object is not predicted or detected anymore. As a result, the infrared-ray LEDs 66 are allowed to be continuously used also after the prediction or the detection of the contact of the vehicle 1 with another object. Accordingly, it is possible to continuously use the infrared-ray LEDs 66 for a longer period regardless of whether the contact of the vehicle 1 with another object is predicted or detected.

Moreover, according to the example embodiment, in a normal case where the contact of the vehicle 1 with another object is not predicted or detected, the imaging devices 65 of the respective imaging modules may be caused to perform the imaging at respective timings different from each other to thereby cause the infrared-ray LEDs 66 of the respective imaging modules to emit the light at respective timings different from each other. Accordingly, in the normal case, the imaging modules are each allowed to perform imaging of the occupant at its own timings with application of light to the occupant only by its own infrared-ray LED 66. Further, it is more difficult for each of the infrared-ray LEDs 66 to continue applying strong light to the occupant. This makes it possible to perform favorable imaging of a state of a part such as the retina or the blood vessel of the occupant.

According to the example embodiment, in a case where the contact of the vehicle 1 is predicted or detected, the imaging device 65 of each of the imaging modules may be caused to perform the imaging at a higher speed than in a case where the contact of the vehicle 1 with another object is not predicted or detected. Even if such high-speed imaging results in reduction of the imaging period of each image, the total light quantity of the light applied to the occupant increases. Therefore, the imaging image of the occupant is less dark, allowing for imaging of a clear outline of the occupant. Further, obtaining two or more imaging images with the clear outline of the occupant for every short imaging period makes it possible to precisely obtain the data regarding the position of the occupant substantially in real time after the prediction or the detection of the contact of the vehicle 1 with another object.

Because the data regarding the position of the occupant is allowed to be obtained precisely and substantially in real time after the prediction or the detection of the contact of the vehicle 1 with another object, another device of the vehicle 1 such as the occupant protecting apparatus 70 is allowed to appropriately execute the protection control for the occupant in accordance with the precise and real-time position of the occupant.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, according to the example embodiment described above, the center imaging module 61, which is one of the imaging modules, may be provided at the middle part of the dashboard 6 that is positioned in front of the occupant, and the driver imaging module 62, which is another one of the imaging modules, may be provided at the right part of the dashboard 6 that is positioned in front of the occupant, i.e., in front of the seat 4 on which the driver sits.

The two or more imaging modules may be provided in the vehicle compartment 3 at respective locations of a combination other than that described above. For example, the driver imaging module 62 may be provided at the middle part of the dashboard 6 in front of the occupant together with the center imaging module 61. Moreover, the imaging modules may not necessarily operate as illustrated in (A) to (C) of FIG. 8 in the normal case which is other than the case where the contact of the vehicle 1 with another object is predicted. For example, the imaging modules may perform the imaging operation together also in the normal case. Moreover, the imaging images obtained by the respective imaging modules may not necessarily be used individually for any process. For example, the imaging images obtained by the respective imaging modules may be used, as stereo-camera imaging images, to perform a process of determining the state such as the position of the occupant.

Each of the drive ECU 11, the steering ECU 12, the brake ECU 13, the automatic driving/driving assist ECU 14, the driving operation ECU 15, the detection ECU 16, the occupant monitoring ECU 17, the occupant protection ECU 18, the external communication ECU 19, and the UIECU 20 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the drive ECU 11, the steering ECU 12, the brake ECU 13, the automatic driving/driving assist ECU 14, the driving operation ECU 15, the detection ECU 16, the occupant monitoring ECU 17, the occupant protection ECU 18, the external communication ECU 19, and the UIECU 20 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the drive ECU 11, the steering ECU 12, the brake ECU 13, the automatic driving/driving assist ECU 14, the driving operation ECU 15, the detection ECU 16, the occupant monitoring ECU 17, the occupant protection ECU 18, the external communication ECU 19, and the UIECU 20 illustrated in FIG. 2.

The invention claimed is:

1. A vehicle occupant monitoring apparatus comprising:
a first imaging device configured to capture a first image of a first area in a vehicle at a first timing, the first area including an occupant of the vehicle, the first timing being repeated in a first cycle;
a second imaging device configured to capture a second image of a second area in the vehicle at a second timing, the second area being narrower than the first area and including the occupant, the second timing being repeated in the first cycle;
a first light-emitting device configured to emit light to illuminate the first area only at the first timing;
a second light-emitting device configured to emit light to illuminate the second area only at the second timing; and
a controller coupled to the first imaging device, the second imaging device, the first light-emitting device, and the second light-emitting device, and configured to:
determine whether contact of the vehicle with another object is predicted;
in response to determining that the contact of the vehicle is not predicted, (i) set the first cycle to a first predetermined value, (ii) set the second timing so as to not overlap with the first timing, and (iii) monitor a position of the occupant on a basis of the captured first image; and
in response to determining that the contact of the vehicle is predicted, (i) set the first cycle to a second predetermined value smaller than the first predetermined value, (ii) set the seconding timing to a same timing as the first timing, and (iii) monitor the position of the occupant on the basis of the captured first image.

2. The vehicle occupant monitoring apparatus according to claim 1, wherein
each of the first light-emitting device and the second light-emitting device is configured to emit an infrared ray as the light, and
the first light quantity is a light quantity to allow the second imaging device to perform imaging of a retina or a blood vessel of the occupant.

3. The vehicle occupant monitoring apparatus according to claim 2, wherein
the controller is configured, in a case where the contact of the vehicle is not predicted, to monitor a state of the occupant on a basis of the retina or the blood vessel of the occupant included in the captured second image, and
the controller is configured, in the case where the contact of the vehicle is predicted, to stop monitoring the state of the occupant on the basis of the retina or the blood vessel of the occupant.

4. The vehicle occupant monitoring apparatus according to claim 3,
wherein the controller is further configured to:
in response to the determining that the contact of the vehicle is not predicted, cause the first light-emitting device to emit the light at a first light quantity, and cause the second light-emitting device to emit the light at the first light quantity; and
in response to the determining that the contact of the vehicle is predicted, cause the first light-emitting device to emit the light at a second light quantity, and cause the second light-emitting device to emit the light at the second light quantity, wherein the second light quantity is equal to or greater than half of the first light quantity and equal to or less than the first light quantity.

5. The vehicle occupant monitoring apparatus according to claim 2,
wherein the controller is further configured to:
in response to the determining that the contact of the vehicle is not predicted, cause the first light-emitting device to emit the light at a first light quantity, and cause the second light-emitting device to emit the light at the first light quantity; and
in response to the determining that the contact of the vehicle is predicted, cause the first light-emitting device to emit the light at a second light quantity, and cause the second light-emitting device to emit the light at the second light quantity, wherein the second light quantity is equal to or greater than half of the first light quantity and equal to or less than the first light quantity.

6. The vehicle occupant monitoring apparatus according to claim 1,
wherein the controller is further configured to:
in response to the determining that the contact of the vehicle is not predicted, cause the first light-emitting device to emit the light at a first light quantity, and cause the second light-emitting device to emit the light at the first light quantity; and
in response to the determining that the contact of the vehicle is predicted, cause the first light-emitting device to emit the light at a second light quantity, and cause the second light-emitting device to emit the light at the second light quantity, wherein the second light quantity is equal to or greater than half of the first light quantity and equal to or less than the first light quantity.

7. The vehicle occupant monitoring apparatus according to claim 3, further comprising a center imaging module and a driver imaging module,
wherein the occupant includes a driver of the vehicle,
wherein the center imaging module comprises the first imaging device and the first light-emitting device, and is configured to apply the light to the driver of the vehicle and to perform imaging of the driver, the center imaging module being provided in a front-middle part of the vehicle, and
wherein the driver imaging module comprises the second imaging device and the second light-emitting device, and is configured to apply the light to the driver and to perform imaging of the driver, the driver imaging module being provided in front of the driver.

8. The vehicle occupant monitoring apparatus according to claim 7,
wherein the controller is further configured to:
in response to the determining that the contact of the vehicle is not predicted, cause the first light-emitting device to emit the light at a first light quantity, and cause the second light-emitting device to emit the light at the first light quantity; and
in response to the determining that the contact of the vehicle is predicted, cause the first light-emitting device to emit the light at a second light quantity, and cause the second light-emitting device to emit the light at the second light quantity, wherein the second light quantity is equal to or greater than half of the first light quantity and equal to or less than the first light quantity.

9. A vehicle occupant protecting system comprising:

a vehicle occupant monitoring apparatus configured to monitor a position of an occupant present in a vehicle; and an occupant protecting apparatus configured to perform protection control for the occupant on a basis of the position of the occupant monitored by the vehicle occupant monitoring apparatus, the vehicle occupant monitoring apparatus including:

a first imaging device configured to capture a first image of a first area in a vehicle at a first timing, the first area including an occupant of the vehicle, the first timing being repeated in a first cycle;

a second imaging device configured to capture a second image of a second area in the vehicle at a second timing, the second area being narrower than the first area and including the occupant, the second timing being repeated in the first cycle;

a first light-emitting device configured to emit light to illuminate the first area only at the first timing;

a second light-emitting device configured to emit light to illuminate the second area only at the second timing; and a controller coupled to the first imaging device, the second imaging device, the first light-emitting device, and the second light-emitting device, and configured to:

determine whether contact of the vehicle with another object is predicted;

in response to determining that the contact of the vehicle is not predicted, (i) set the first cycle to a first predetermined value, (ii) set the second timing so as to not overlap with the first timing, and (iii) monitor a position of the occupant on a basis of the captured first image; and in response to determining that the contact of the vehicle is predicted, (i) set the first cycle to a second predetermined value smaller than the first predetermined value, (ii) set the seconding timing to a same timing as the first timing, and (iii) monitor the position of the occupant on the basis of the captured first image.

10. A vehicle occupant monitoring apparatus comprising:

a first imaging device configured to capture a first image of a first area in a vehicle at a first timing, the first area including an occupant of the vehicle, the first timing being repeated in a first cycle;

a second imaging device configured to capture a second image of a second area in the vehicle at a second timing, the second area being narrower than the first area and including the occupant, the second timing being repeated in the first cycle;

a first light-emitting device configured to emit light to illuminate the first area only at the first timing;

a second light-emitting device configured to emit light to illuminate the second area only at the second timing; and circuitry coupled to the first imaging device, the second imaging device, the first light-emitting device, and the second light-emitting device, and configured to:

determine whether contact of the vehicle with another object is predicted;

in response to determining that the contact of the vehicle is not predicted, (i) set the first cycle to a first predetermined value, (ii) set the second timing so as to not overlap with the first timing, and (iii) monitor a position of the occupant on a basis of the captured first image; and in response to determining that the contact of the vehicle is predicted, (i) set the first cycle to a second predetermined value smaller than the first predetermined value, (ii) set the seconding timing to a same timing as the first timing, and (iii) monitor the position of the occupant on the basis of the captured first image.

* * * * *